(12) United States Patent
Grossman et al.

(10) Patent No.: US 10,606,476 B2
(45) Date of Patent: Mar. 31, 2020

(54) TECHNIQUES FOR INTERACTING WITH HANDHELD DEVICES

(71) Applicant: AUTODESK, INC., San Rafael, CA (US)

(72) Inventors: Tovi Grossman, Toronto (CA); Xiang Anthony Chen, Pittsburgh, PA (US); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 570 days.

(21) Appl. No.: 14/560,385

(22) Filed: Dec. 4, 2014

(65) Prior Publication Data

US 2015/0153952 A1 Jun. 4, 2015

Related U.S. Application Data

(60) Provisional application No. 61/911,954, filed on Dec. 4, 2013.

(51) Int. Cl.
*G06F 3/0488* (2013.01)
*G06F 1/16* (2006.01)
*G06F 3/0346* (2013.01)

(52) U.S. Cl.
CPC .......... *G06F 3/04886* (2013.01); *G06F 1/163* (2013.01); *G06F 1/1626* (2013.01); *G06F 1/1694* (2013.01); *G06F 3/0346* (2013.01); *G06F 3/04883* (2013.01); *G06F 2203/0381* (2013.01); *G06F 2203/0382* (2013.01); *G06F 2203/04808* (2013.01)

(58) Field of Classification Search
CPC .. G06F 3/04886; G06F 3/0346; G06F 3/0488; G06F 3/04883
See application file for complete search history.

(56) References Cited

U.S. PATENT DOCUMENTS

| 2012/0011462 A1* | 1/2012 | Westerman ........... G06F 3/0416 715/773 |
| 2013/0271369 A1* | 10/2013 | Lu ........................ G06F 3/0416 345/157 |
| 2015/0100911 A1* | 4/2015 | Yin ..................... G06F 3/04883 715/773 |

OTHER PUBLICATIONS

Blasko, et al., "Evaluation of an Eyes-Free Cursorless Numeric Entry System for Wearable Computers", IEEE Wearable Computers, 2006, pp. 21-28.
Buxton, "Chunking and Phrasing and the Design of Human-Computer Dialogues", IFIP Congress, 1995, pp. 494-499.
Cao, et al., "Modeling Human Performance of Pen Stroke Gestures", CHI 2007 Proceedings, Models of Mobile Interaction, Apr. 28-May 3, 2007, pp. 1495-1504.

(Continued)

*Primary Examiner* — Andrea C Leggett
(74) *Attorney, Agent, or Firm* — Artegis Law Group, LLP (57) ABSTRACT

In one embodiment of the present invention, at least a portion of a keyboard is displayed on a touch-screen display. A first action performed via the touch-screen display is detected. Based on the detected first action, a region of the at least a portion of the keyboard is displayed on the touch-screen display. A second action performed via the touch-screen display is detected. Based on the second action, a character may be selected or the full keyboard may be re-displayed. The first action and the second action may be performed anywhere on the touch display.

23 Claims, 4 Drawing Sheets

(56) References Cited

OTHER PUBLICATIONS

Chen, et al., "Swipeboard: A Text Entry Technique for Ultra-Small Devices That Supports Novice to Expert Transitions", Input Techniques, UIST'14, Oct. 5-8, 2014, pp. 4.
Cornwell, "Morse Code at 140 WPM", The National Association for Amateur Radio, 2008, 4 pages.
Kristensson, et al., "SHARK2: A Large Vocabulary Shorthand Writing System for Pen-based Computers", ACM UIST '04, Oct. 24-27, pp. 43-52.
Kurtenbach, et al., "The Design of a GUI Paradigm based on Tablets, Two-hands, and Transparency", ACM CHI '97, pp. 35-42.
Kurtenbach, "The Design and Evaluation of Marking Menus", Diss., University of Toronto, 1993, 201 pages.
MacKenzie, et al., "1 Thumb, 4 Buttons, 20 Words Per Minute: Design and Evaluation of H4-Writer", UIST 2011, pp. 471-480.
MacKenzie, et al., "The Design and Evaluation of a High-Performance Soft Keyboard", ACM CHI 1999, pp. 25-31.
Oney, et al., "ZoomBoard: A Diminutive QWERTY Soft Keyboard Using Iterative Zooming for Ultra-Small Devices", ACM CHI '13, Apr. 27-May 2, 2013., pp. 2799-2802.
Partridge, et al., TiltType: Accelerometer-Supported Text Entry for Very Small Devices, ACM UIST, 2002, pp. 201-204.
Perlin, "Quikwriting: Continuous Stylus-based Text Entry", ACM UIST '98, pp. 215-216.
Siek, et al., "Fat Finger Worries: How Older and Younger Users Physically Interact with PDAs", Interact, Sep. 2005, pp. 267-280.
Wigdor, et al., "A Comparison of Consecutive and Concurrent Input Text Entry Techniques for Mobile Phones", ACM CHI '04, vol. 6, No. 1, Apr. 24-29, 2004, pp. 81-88.
Wigdor, et al., "TiltText: Using Tilt for Text Input to Mobile Phones", ACM UIST 2003, pp. 81-90.
Wobbrock, et al., "EdgeWrite: A Stylus-Based Text Entry Method Designed for High Accuracy and Stability of Motion", ACM UIST 2003, pp. 61-70.
Wobbrock, et al., "The Angle Mouse: Target-Agnostic Dynamic Gain Adjustment Based on Angular Deviation", ACM CHI 2009, pp. 1401-1410.
Zhai, S. and Kristensson, P.-O. Shorthand writing on stylus keyboard. ACM CHI '03, ACM Press, 2003, pp. 97-104.

* cited by examiner

TECHNIQUES FOR INTERACTING WITH HANDHELD DEVICES

CROSS-REFERENCE TO RELATED APPLICATIONS

This application claims benefit of the U.S. Provisional Patent Application having Ser. No. 61/911,954 and filed on Dec. 4, 2013. The subject matter of this related application is hereby incorporated herein by reference.

BACKGROUND OF THE INVENTION

Field of the Invention

Embodiments of the present invention relate generally to computer science and, more specifically, to more effective approaches and techniques for interacting with handheld devices, including all aspects of the related hardware, software, and algorithms associated with implementing that function.

Description of the Related Art

Typing is an important part of interacting with many digital devices, including desktop computers and "smart" devices, such as cellular phones, tablet computers, "phablet" devices, "smart" watches and glasses, to name a few. For "smart" devices, soft keyboards are often used for entering text. However, as "smart" devices become smaller, it is increasingly difficult to type on a soft keyboard and correctly input the desired text.

To mitigate this problem, text entry solutions have been proposed that involve new gestures or additional sensors. However, not all of these solutions can be adapted to ultra-small interfaces, such as an interface on a "smart" watch or even smaller device. Those interfaces that have been implemented often have a limited text entry speed.

Shorthand techniques, such as Morse code, promise a much faster entry speed and can be adapted to ultra-small interfaces. However, learning shorthand techniques can be difficult for users and often resort to rote memory. In short, various text entry techniques present a dilemma in that techniques palatable to users only give incremental speed improvement, while shorthand techniques are associated with faster text entry speeds, but present greater barriers for user learning and acceptance.

As the foregoing illustrates, what is needed in the art are techniques that support faster text entry speeds on ultra-small devices and also are easier for new users to learn than conventional techniques.

SUMMARY OF THE INVENTION

In one embodiment of the present invention, at least a portion of a keyboard is displayed on a touch-screen display. A first action performed via the touch-screen display is detected. Based on the detected first action, a region of the at least a portion of the keyboard is displayed on the touch-screen display. A second action performed via the touch-screen display is detected. Based on the second action, a character may be selected or the full keyboard may be re-displayed. The first action and the second action may be performed anywhere on the touch display.

One advantage of disclosed approach is that the technique is easy to learn and leverages existing knowledge of the common, modern day keyboard layout known as the "QWERTY" keyboard. The technique also allows an expert to perform efficient, eyes-free input. Another advantage is that the disclosed technique is target agnostic, which means that the technique requires no knowledge of target locations or dimensions. The first action and the second action may therefore be performed anywhere on a given touch display.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
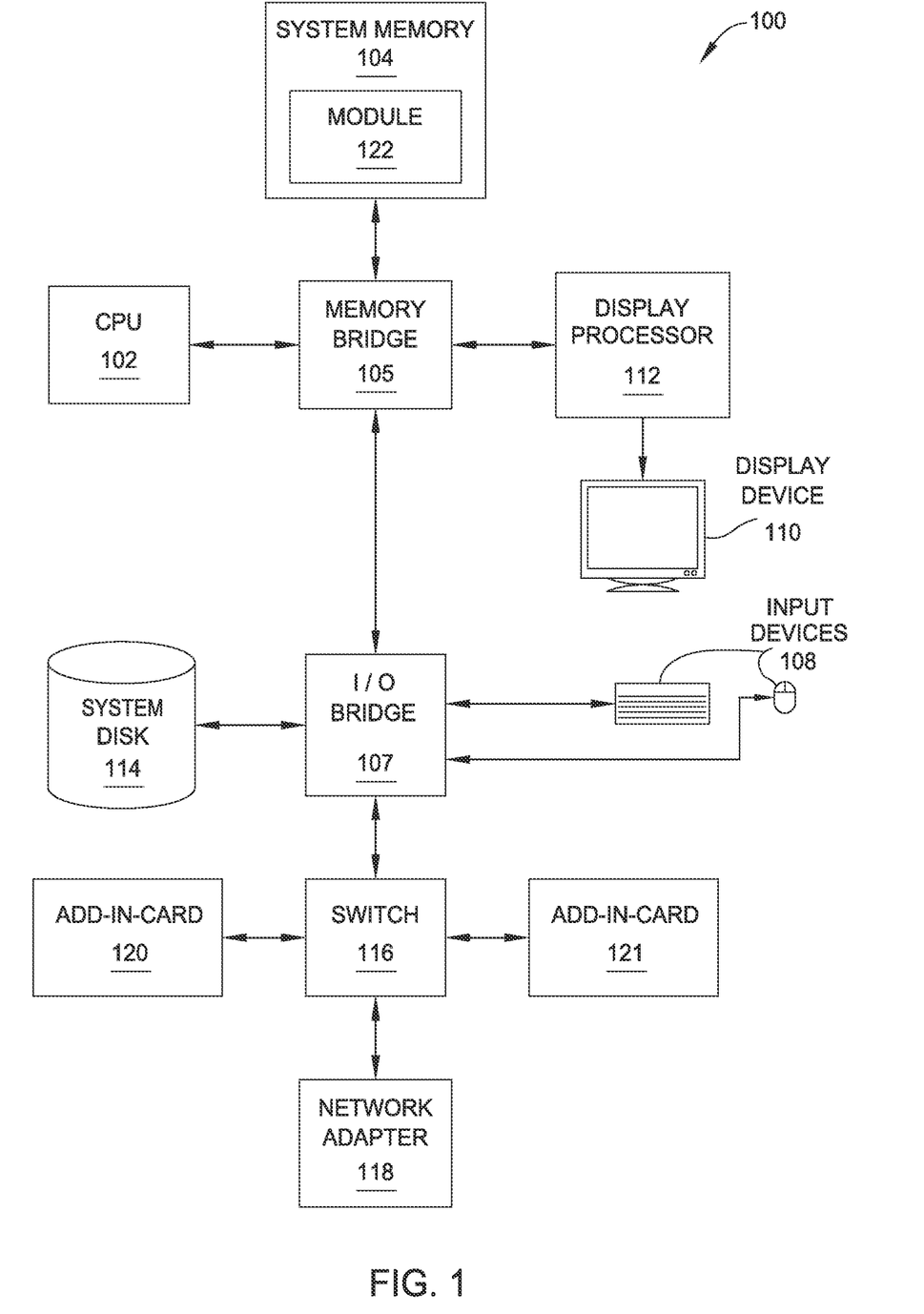
FIG. 1 is a block diagram of a system configured to implement one or more aspects of the present invention.

FIG. 1 is a block diagram of a system configured to implement one or more aspects of the present invention. FIG. 1 depicts one architecture of a system 100 within which embodiments of the present invention may be implemented. This figure in no way limits or is intended to limit the scope of the present invention.

System 100 may be a personal computer, video game console, personal digital assistant, mobile phone, mobile device or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

System memory 104 can contain or comprise an engine or module 122 configured to implement the functions and operations of the Swipeboard system. In one embodiment, the module can be software comprised of program instructions executed by a CPU or by a special purpose processor, such as a graphics processing unit (GPU). In other embodiments, the module can be implanted as a hardware element, comprised of circuitry and logic configured to implement the flow, or can be any combination of hardware and/or software.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one GPU and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVDROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Text Entry Technique for Ultra-small Interfaces

Figure 2:
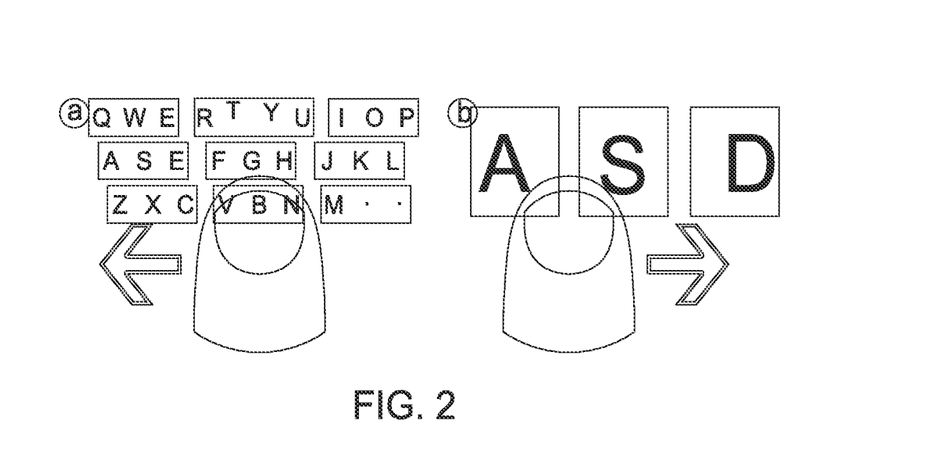
FIG. 2 illustrates a text entry technique for touch-screen interfaces in accordance with one embodiment of the present invention.

FIG. 2 illustrates a text entry technique for touch-screen interfaces in accordance with one embodiment of the present invention. The text entry technique is referred to herein as "Swipeboard." Swipeboard supports fast text entry on ultra-small devices and can also be used on larger devices. Swipeboard leverages a user's spatial memory of the common "QWERTY" keyboard layout to encode each alphabetic character into two touch actions that navigate to the key of that character. Swipeboard uses simple, discrete actions that are suitable for ultra-small touch-screen interfaces, rather than using compound, continuous strokes, which cause difficulties for users when interacting with ultra-small touch-screen interface.

As illustrated on the left side of FIG. 2, Swipebaord utilizes a graphical representation of a keyboard. Swipeboard divides a QWERTY keyboard (or any other suitable keyboard layout) into nine regions. The first swipe performed by the user specifies the region where the desired character is located. For example, swiping left would specify the region "ASD", while swiping up would represent the region "RTYU". To select the center region "FGH", the user would tap anywhere on the display. A second swipe or tap specifies the character within the region selected by the first swipe or tap. For example, for the second movement, swiping left selects the key on the left, swiping right selects the key on the right, and tapping anywhere selects the key in the center. In the case of four keys (such as RTYU in FIG. 2), swiping left selects 'R', up-left selects 'T', up-right selects 'Y', and right selects 'U'. If the first swipe or tap is incorrect, a swipe down can be used to restore the keyboard to the top level. Other gestures or actions may be used to restore the keyboard to the top level, such as a two-second timeout. Other combinations of swipes may be used for additional functions. For example, a double-swipe down-left could be used to delete a character. A double-swipe down-right could be used to enter a space. A double-swipe up could be used to switch to a symbols and numbers keyboard.

Swipeboard has several advantages over conventional text input systems. First, the technique is target agnostic. That means the actions can occur anywhere on the display. For example, a swipe right can be swiped anywhere on the display. Similarly, a tap can occur anywhere on the display. The tap does not have to occur in a specific location on the display, such as with conventional keyboards. A target agnostic system supports ultra-small interfaces when visual cues may not be legible to the human eye. A second advantage of Swipeboard is that the gestures are based on the QWERTY keyboard layout. Basing Swipeboard on the QWERTY keyboard layout makes Swipeboard more accessible to novice users, who probably have some familiarity with QWERTY keyboards. Finally, Swipeboard should allow an expert user to implement a single character entry into an efficient and eyes-free double action move (either swipes or taps or a combination), without relying on visuals, which supports fast text entry.

Figure 3:
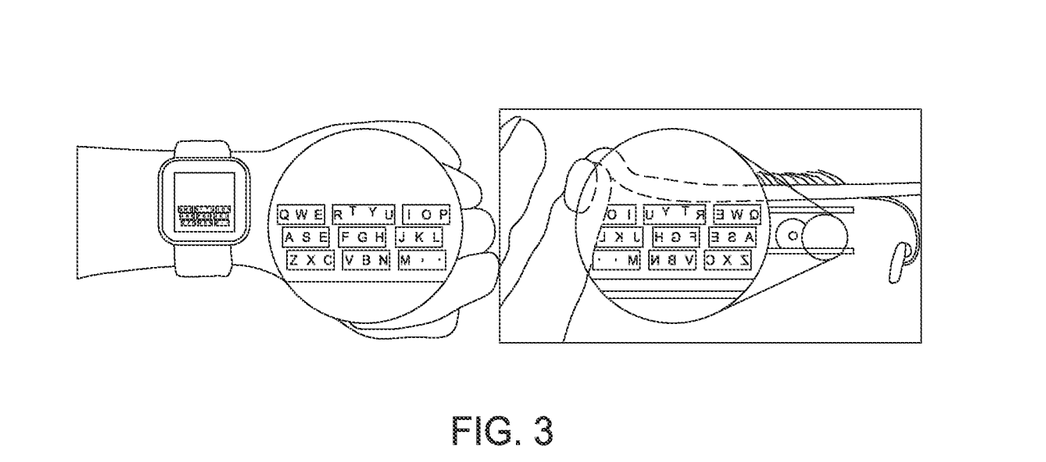
FIG. 3 illustrates two use cases in accordance with certain embodiments of the present invention.

Swipeboard can be used at very small sizes, with the limiting factor being the legibility of the display and not the size of the display area. Swipeboard is thus ideal for "smart" watches or even "smart" eyewear. See, for example, FIG. 3 which illustrates two use cases in accordance with certain embodiments of the present invention.

Tests and studies have been performed to determine the performance of Swipeboard compared to other text input systems. Each swipe or tap may be referred to as an action. Novice users generally must identify the gesture for a target key before each action. The time to identify the gesture before action is referred to as the "up" process.

Text entry for novices is thus carried out as two separate units of interaction that consist of a total of four steps ($1^{st}$ up, $1^{st}$ action, $2^{nd}$ up, and $2^{nd}$ action).

Eventually, novices will rely on the visuals of the keyboard and their knowledge of the QWERTY layout to specify a key. Gradually, novices will transition to an expert phase by trying to associate two actions for each specific key. For example, after practice a user will remember that the letter "a" may be input by swiping left twice. The user will then enter the letter "a" using rote memory and will not have to look at the keys, which is the same process used by a touch typist on a standard QWERTY keyboard.

The time for the up actions will gradually decrease as the user becomes less reliant on searching for a key to input and thus cuts the decision time. In particular, Swipeboard performance can be modeled by Equation 1:

$$T = T_{u1} + T_{a1} + T_{u2} + T_{a2} \tag{1}$$

where the total time T is the sum of the two "up" steps ($T_{u1}$, $T_{u2}$) and two action steps ($T_{a1}$, $T_{a2}$). Based on research, a stroke or tap time may be approximately 100 ms. See Cao, X. and Zhai, S., *Modeling Human Performance of Pen Stroke Gestures*, CHI 2007, p. 1495-1504. Thus, for a novice, a character entry time may be represented by Equation 2:

$$T_{nov} = T_{u1} + 100 + T_{u2} + 100 \tag{2}$$

To model expert use, two assumptions are made. First, their initial reaction time is optimal, so a value of 200 ms is assigned to Tu1 as an approximate human limit. See Welford, A. T., Reaction Time, Speed of Performance, and Age, *Annals of the New York Academy of Sciences* 515, 1 (1988), p. 1-17. Second, the expert is assumed to perform the two swipes (or taps) into a single action, reducing $T_{u2}$ to the time it takes to lift the finger between the two actions. It has been found to take approximately 127 ms to lift and tap in place. See MacKenzie, I. S. and Zhang, S. X., *The Design and Evaluation of a High-Performance Soft Keyboard*, ACM CHI 1999, p. 25-31. The up time $T_{u2}$ can be estimated as half of that time, or 64 ms. As such, a predicted optimal upper limit character entry time $T_{opt}$ is shown in Equation 3:

$$T_{opt} = 200 + 100 + 64 + 100 \tag{3}$$

The predicted upper limit entry time equates to 464 ms per character, or approximately 25.87 words per minute (WPM). Thus, the model described above model shows that the difference between an expert and a novice using Swipeboard lies in the length of time that the finger is up. The novice must determine the correct swipe at each level, mostly through visual search, while an expert immediately performs the actions upon recalling what actions are associated with the desired key.

Studies have been performed to measure the effectiveness of Swipeboard for entering text on ultra-small devices. Swipeboard was compared to Zoomboard. Zoomboard is a technique that uses iterative zooming for enlarging a section of keys on the interface. With Zoomboard, a user first taps a section of the keyboard near a desired character, and Zoomboard enlarges that section of the keyboard. Then, with a second tap on the enlarged section, the user can select a desired key.

One study consisted of text entry trials. Each trial consisted of a four letter word, with each word consisting of four characters from the set: E, T, A, N, S. A reduced word test allowed for a way to quickly test the novice-expert performance growth by artificially accelerating the learning of the techniques by focusing on a small word set.

Participants were randomly assigned to use either the Swipeboard technique or the Zoomboard technique. The techniques were implemented on an Apple iPad tablet device with a keyboard dimension of 12 mm by 12 mm on the display (about ¼ the size of a regular "smart" watch). Further details of the study can be found in U.S. Provisional Patent Application 61/911,954, which has been incorporated herein by reference.

Figure 4:
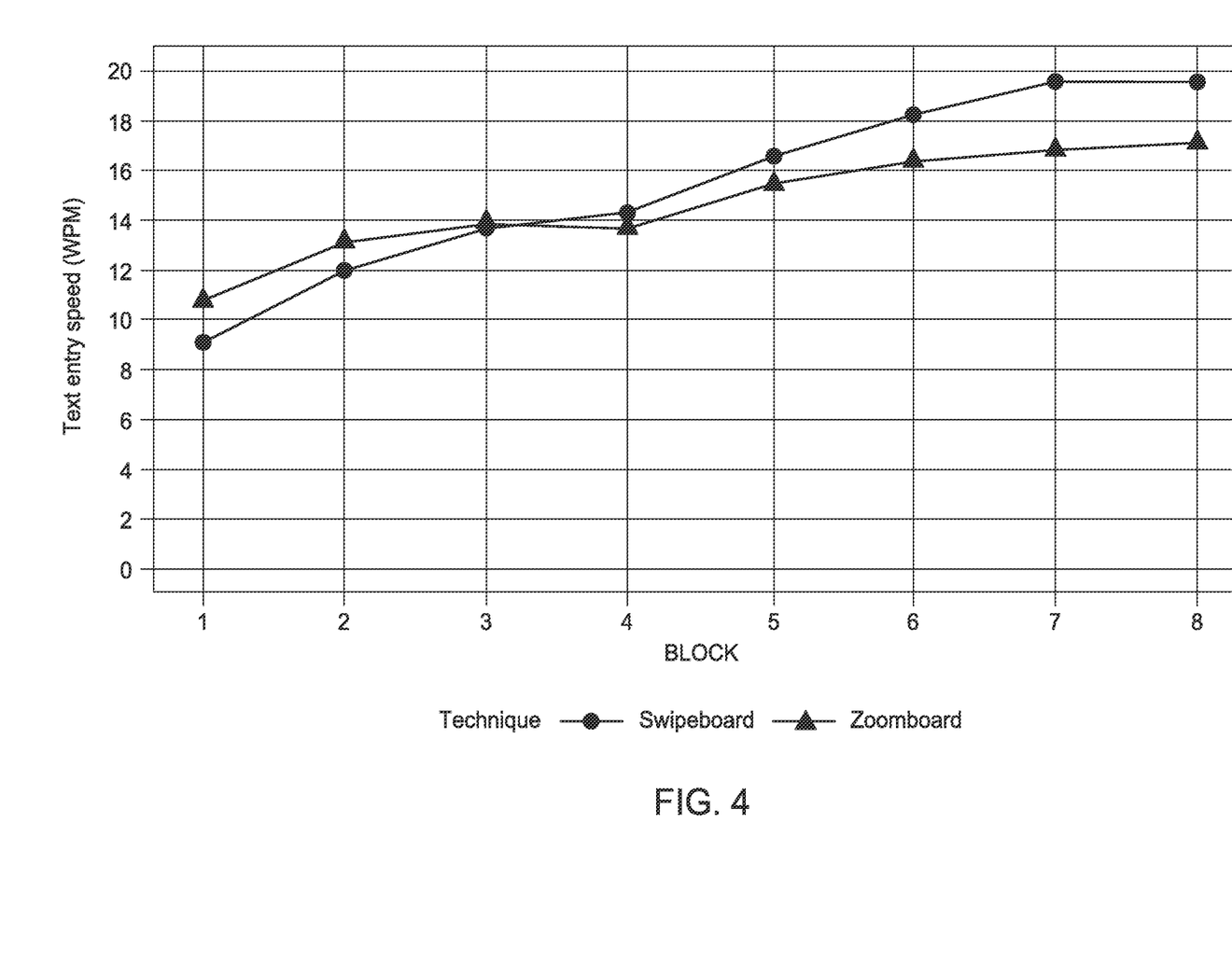
FIG. 4 illustrates aggregated word-per-minute (WPM) results for a study comparing Swipeboard and Zoomboard, in accordance with at least one embodiment of the present invention.

FIG. 4 illustrates aggregated word-per-minute (WPM) results for a study comparing Swipeboard and Zoomboard, in accordance with at least one embodiment of the present invention. The blocks of the study are illustrated on the x-axis. For each block, participants were asked to enter 108 words. The y-axis illustrates the text entry speed, in WPM. Although Swipeboard users did not start faster than Zoomboard users, participants were able to learn the technique and achieve a higher entry speed than Zoomboard users after about 35 to 45 minutes' of usage time, as illustrated in FIG. 4. By the end of the study, Swipeboard's WMP was 19.58, or 15% faster than Zoomboard's 17.08 WPM. The WMP result was found to be statistically significant.

Both techniques require two steps for entering a character. Two types of errors are inherent to the design of these techniques: soft errors and hard errors. A soft error is an error made in the first step of entering a character. For Zoomboard, a soft error involves zooming into the wrong area of the keyboard. For Swipeboard, a soft error involves swiping or tapping to the wrong regions of keys.

A hard error is made in the second step of entering a character. For Zoomboard, a hard error involves tapping the wrong key in the correct zoomed-in area. For Swipeboard, a hard error involves swiping or tapping the wrong character within a region of keys.

Soft errors, as described above, reflect the difficulty of correctly making the first step of each technique. Overall, the soft error rates were 4.183% for Swipeboard and 4.739% for Zoomboard. The difference in soft error rates was not statistically significant. Hard error rates reflect the difficulty of making the second step of each technique. The hard error rates were 13.30% for Swipeboard and 14.90% for Zoomboard, and the difference is significant.

A system utilizing Swipeboard may incorporate a probabilistic model when recognizing entries of characters with different usage frequencies (i.e., text prediction or error correction). Language models may also be used where only the first swipes or taps are needed to specify a word—similar to the traditional T9 system on numeric keyboards, except that the target agnostic swipes and taps require no actual keys to be devised or rendered on the interface.

Figure 5:
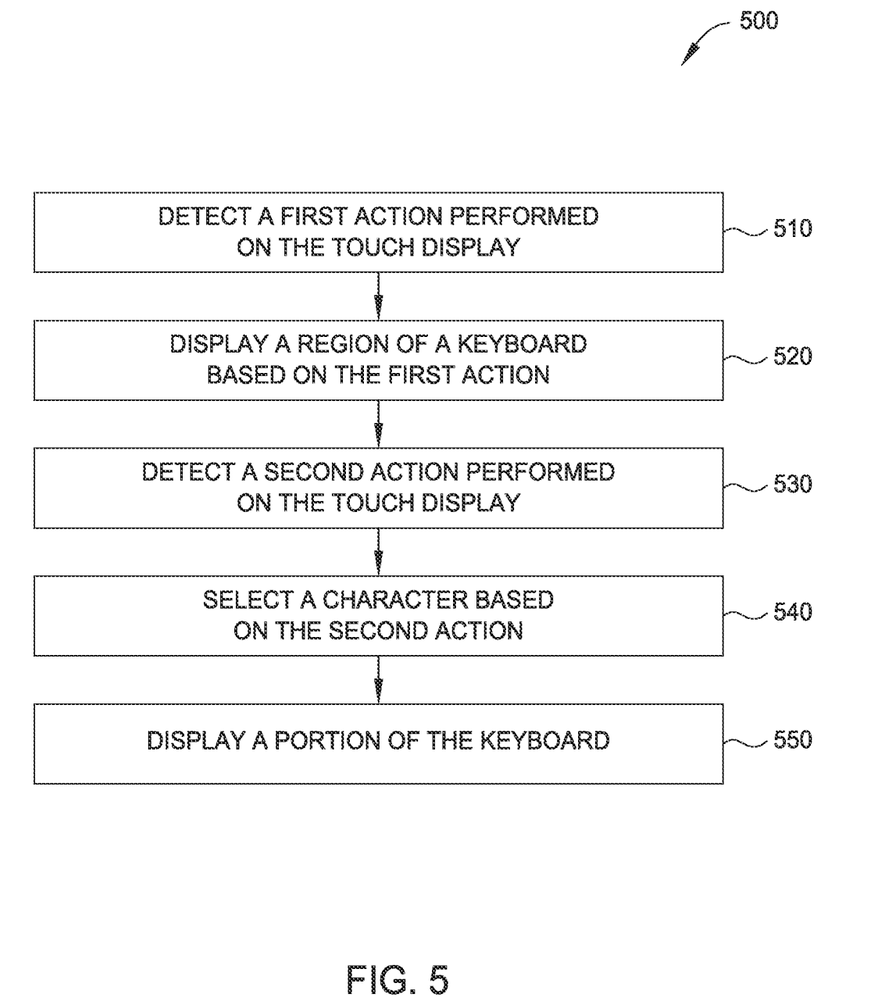
FIG. 5 is a flow diagram of method steps for entering text on a touch display, in accordance with one embodiment of the present invention.

FIG. 5 is a flow diagram of method steps for entering text on a touch display, in accordance with one embodiment of the present invention. Although the method steps are described in conjunction with FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 5. In some embodiments, the Swipeboard module 122 illustrated in FIG. 1 can perform some or all of the steps in FIG. 5.

A shown, a method 500 begins at step 510 where a first action performed by a user on the touch display is detected. In step 510, the full QWERTY keyboard is displayed to the user. In this example embodiment, the first action can be one of nine actions: either a swipe in one of eight directions or a tap. The eight directions are up, down, left, right, up-left, up-right, down-left, and down-right. Each direction is associated with a specific region of the QWERTY keyboard.

In step 520, a selected region of a keyboard is displayed based on the detected first action from step 510. The region displayed is a selection of either 3 or 4 adjacent characters on the QWERTY keyboard. For example, up-left will select the region comprising the characters QWE of the QWERTY keyboard, and only those characters will then be displayed. Similarly, down-left will select and display the region comprising the characters ZXC. A tap selects the center of the QWERTY keyboard, displaying the characters FGH.

In step 530, a second action performed by the user is detected. The user performs the second action to select the desired character from the region selected and displayed in step 520. For example, if a swipe to the left was the first action detected in step 510, step 520 will display the letters ASD. The second action will therefore select one of the letters ASD. If the user swipes left anywhere on the display, A is selected. If the user swipes right anywhere on the display, D is selected. And if the user taps anywhere on the display, S is selected. If the user made a mistake in the first action and did not intend to select "ASD", the user can revert back to displaying the full QWERTY keyboard by performing a predetermined "restore" action, such as swiping down or waiting a specified period of time without performing the second action. At that point the full QWERTY keyboard will be displayed and the process can start over at step 510.

In step 540, the character associated with the second action detected in step 530 is selected. After the desired character is selected in step 540, the display can then revert to showing the entire QWERTY keyboard, or a portion thereof.

In step 550, the QWERTY keyboard or a portion of the QWERTY keyboard is displayed so that the method 500 can begin again at step 510. The user can continue to enter characters until the entire text entry is complete. The Swipeboard module can detect a third action performed via the touch-screen display, display a region of the at least a portion of the keyboard on the touch-screen display based at least in part on the third action, and then detect a fourth action performed via the touch-screen display.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for inputting text on a touch-screen display, the method comprising:
    displaying at least a portion of a keyboard on the touch-screen display, the at least a portion of the keyboard comprising a plurality of regions, each region comprising a plurality of adjacent keys included in the at least portion of the keyboard;
    detecting a first action performed via the touch-screen display, wherein the first action comprises a gesture;
    in response to detecting the first action, performing the steps of:
        no longer displaying the at least a portion of the keyboard on the touch-screen display; and
        displaying a selected region of the at least a portion of the keyboard on the touch-screen display, wherein a direction of the first action identifies the selected region from the plurality of regions of the at least a portion of the keyboard; and
    detecting a second action performed via the touch-screen display.

2. The method of claim 1, further comprising selecting a key based at least in part on the second action.

3. The method of claim 2, further comprising:
    displaying the at least a portion of a keyboard on the touch-screen display;
    detecting a third action performed via the touch-screen display;
    in response, displaying a region of the at least a portion of the keyboard on the touch-screen display based at least in part on the third action; and
    detecting a fourth action performed via the touch-screen display.

4. The method of claim 1, further comprising selecting the key from the selected region based at least in part on the second action.

5. The method of claim 1, wherein the at least a portion of the keyboard is redisplayed on the touch-screen display based at least in part on the second action.

6. The method of claim 1, wherein the first action and the second action each comprise a tap gesture or a swipe gesture having a specific direction.

7. The method of claim 1, wherein detecting the first action comprises detecting the first action at any location within the touch-screen display.

8. The method of claim 1, wherein the at least a portion of the keyboard displayed is configured as at least a portion of a QWERTY keyboard.

9. The method of claim 1, wherein the second action comprises a pause of a predetermined length, and the touch display displays the at least a portion of the keyboard based at least in part on the pause.

10. The method of claim 1, wherein each region comprises a plurality of adjacent keys of a QWERTY keyboard.

11. The method of claim 1, wherein displaying the selected region of the at least a portion of the keyboard comprises displaying only the selected region of the plurality of regions and not displaying any unselected regions of the plurality of regions of the at least a portion of the keyboard.

12. The method of claim 1, wherein displaying the selected region of the at least a portion of the keyboard comprises displaying the selected region of the plurality of regions and not displaying any other part of the keyboard.

13. A computer-readable storage medium including instructions that, when executed by a processing unit, cause the processing unit to input text on a touch display by performing the steps of:
    displaying at least a portion of a keyboard on the touch-screen display, the at least a portion of the keyboard comprising a plurality of regions, each region comprising a plurality of adjacent keys included in the at least portion of the keyboard;
    detecting a first action performed via the touch-screen display, wherein the first action comprises a gesture;
    in response to detecting the first action, performing the steps of:
        no longer displaying the at least a portion of the keyboard on the touch-screen display; and
        displaying a selected region of the at least a portion of the keyboard on the touch-screen display, wherein a direction of the first action identifies the selected region from the plurality of regions of the at least a portion of the keyboard; and
    detecting a second action performed via the touch-screen display.

14. The computer-readable storage medium of claim 13, further comprising selecting a key based at least in part on the second action.

15. The computer-readable storage medium of claim 14, further comprising performing the steps of:
   displaying the at least a portion of a keyboard on the touch-screen display;
   detecting a third action performed via the touch-screen display;
   in response, displaying a region of the at least a portion of the keyboard on the touch-screen display based at least in part on the third action; and
   detecting a fourth action performed via the touch-screen display.

16. The computer-readable storage medium of claim 13, further comprising selecting the key from the selected region based at least in part on the second action.

17. The computer-readable storage medium of claim 13, wherein the at least a portion of the keyboard is redisplayed on the touch-screen display based at least in part on the second action.

18. The computer-readable storage medium of claim 13, wherein the first action and the second action each comprise a tap gesture or a swipe gesture having a specific direction.

19. The computer-readable storage medium of claim 13, wherein detecting the first action comprises detecting the first action at any location within the touch-screen display.

20. The computer-readable storage medium of claim 13, wherein the second action comprises a pause of a predetermined length, and the touch-screen display displays the portion of the keyboard based at least in part on the pause.

21. A system configured to input text on a touch display, the system comprising:
   a touch-screen display;
   a memory storing instructions; and
   a processor configured to execute the instructions to:
      display at least a portion of a keyboard on the touch-screen display, the at least a portion of the keyboard comprising a plurality of regions, each region comprising a plurality of adjacent keys included in the at least portion of the keyboard;
      detect a first action performed via the touch-screen display, wherein the first action comprises a gesture;
      in response to detecting the first action, performing the steps of:
         no longer display the at least a portion of the keyboard on the touch-screen display; and
         display a selected region of the at least a portion of the keyboard on the touch-screen display, wherein a direction of the first action identifies the selected region from the plurality of regions of the at least a portion of the keyboard; and
      detect a second action performed via the touch-screen display.

22. The system of claim 21, wherein the processor is further configured to select a key from the selected region based at least in part on the second action.

23. The system of claim 21, wherein the first action and the second action each comprise a tap gesture or a swipe gesture having a specific direction.

* * * * *